(12) United States Patent
Babour et al.

(10) Patent No.: US 8,804,462 B2
(45) Date of Patent: Aug. 12, 2014

(54) MARINE VIBRATOR WITH IMPROVED SEAL

(75) Inventors: Kamal Babour, Bures sur Yvette (FR); Emmanuel Coste, Oslo (NO); Martin Howlid, Blommenholm (NO)

(73) Assignee: WesternGeco L.L.C., Houston, TX (US)

( * ) Notice: Subject to any disclaimer, the term of this patent is extended or adjusted under 35 U.S.C. 154(b) by 802 days.

(21) Appl. No.: 12/966,685

(22) Filed: Dec. 13, 2010

(65) Prior Publication Data

US 2012/0081997 A1 Apr. 5, 2012

Related U.S. Application Data

(60) Provisional application No. 61/389,137, filed on Oct. 1, 2010.

(51) Int. Cl.
*G01V 1/135* (2006.01)
*G01V 1/38* (2006.01)
(52) U.S. Cl.
CPC ..................................... *G01V 1/135* (2013.01)
USPC .......................................... 367/143; 181/120
(58) Field of Classification Search
CPC .................................................... G01V 1/135
USPC ................... 367/143, 144, 146; 181/119, 120
See application file for complete search history.

(56) References Cited

U.S. PATENT DOCUMENTS

| | | | |
|---|---|---|---|
| 3,610,366 A * | 10/1971 | Goldberg | ...................... 181/120 |
| 3,926,413 A | 12/1975 | D'Urso | |
| 4,131,178 A | 12/1978 | Bouyoucos | |
| 4,603,409 A | 7/1986 | Jaworski | |
| 5,062,089 A * | 10/1991 | Willard et al. | ................ 367/172 |
| 5,128,907 A * | 7/1992 | Pascouet | ....................... 367/144 |
| 5,825,720 A * | 10/1998 | Harrison et al. | .............. 367/144 |
| 7,467,685 B2 | 12/2008 | Shehab et al. | |

FOREIGN PATENT DOCUMENTS

| | | | | |
|---|---|---|---|---|
| GB | 2172997 A | * | 10/1986 | ............. G01V 1/137 |
| JP | 2005134338 A | | 5/2005 | |

OTHER PUBLICATIONS

International Search Report and Written Opinion of PCT/US2011/052077 dated Apr. 9, 2012: pp. 1-11. pages.

* cited by examiner

*Primary Examiner* — Ian J Lobo

(57) ABSTRACT

A marine vibrator with improved seal is described. The marine vibrator includes a housing and piston within the housing for generating vibratory signals. The improved seal is comprised of a two-stage seal having a first seal disposed adjacent the water interface and a second seal disposed away from the water interface, thus improving the reliability of the marine vibrator.

25 Claims, 3 Drawing Sheets

MARINE VIBRATOR WITH IMPROVED SEAL

CROSS-REFERENCE TO RELATED APPLICATIONS

This application claims the benefit of U.S. Provisional Patent Application No. 61/389,137, filed Oct. 1, 2010.

BACKGROUND

This disclosure generally relates to marine vibrators for use in acquiring seismic data.

Seismic surveying is used for identifying subterranean elements, such as hydrocarbon reservoirs, freshwater aquifers, gas injection zones, and so forth. In seismic surveying, seismic sources are placed at various locations on a land surface or sea floor, with the seismic sources activated to generate seismic waves directed into a subterranean structure. Seismic data signals are typically acquired by measuring and recording data during a land or marine seismic survey. A land seismic survey may be performed by repeatedly firing a seismic energy source at the surface of the earth and recording the received signals at a set of sensors or receivers. Similarly, a marine seismic survey may be performed by repeatedly firing a seismic energy source (e.g., air-guns, dynamite, marine vibrators or the like) into the sea or at the seafloor and recording the received signals at a set of receivers.

In a towed marine seismic survey, the receivers are typically disposed on seismic streamers and the source is disposed on a seismic source array. Both, the seismic streamers and the seismic source array, may be towed across the sea by a vessel. The sensors may typically be laterally displaced at regular intervals along the seismic streamers. However, there may be situations where a non-regular distribution of the sensors may be preferred or where the source array and the streamers may be positioned at different depth levels.

During the marine seismic survey, the cycle of firing the source and recording the received signals may be repeated a plurality of times. Vibroseis is a seismic method in which a vibrator is used as an energy source to generate a controlled wavetrain. A marine vibrator is an instrument which produces mechanical oscillations and may be used as a seismic source for vibroseis. As such, during a seismic survey, the marine vibrator applies a periodic vibration of continuously varying frequencies into the surrounding medium during a sweep period typically lasting several seconds.

Marine vibrators are large mechanical structures that include moving parts to generate the desired vibrations. A common source of failure with conventional marine vibrators is the seals disposed between moving and stationary parts of the vibrator. Such seals are commonly placed adjacent to the water interface with the vibrator, thus leading to undesirable wear and tear that reduces the reliability of the vibrator.

SUMMARY

A marine vibrator having an improved sealing arrangement is described. The marine vibrator includes a housing and an acoustic piston movably disposed within the housing. The improved sealing arrangement preferably takes the form of a two-stage seal, which provides a first seal between the piston and the housing adjacent to the water interface and a second seal between the piston and the housing, which is disposed radially inward of the first seal and away from the water interface. The first seal preferably takes the form of one or more guide rings disposed in slots formed in the piston and/or housing, while the second seal preferably takes the form of one or more O-rings disposed in a slot formed in the piston and/or housing. A pump system may be disposed adjacent to the first seal to expel any water ingress beyond the first seal. In this manner, substantially no water or contamination is presented at the second seal, thus reducing wear and tear associated with known marine vibrators.

Related systems and methods for deploying and using the marine vibrator according to the present disclosure are also described. Advantages and other features of the present disclosure will become apparent from the following drawing, description and claims.

BRIEF DESCRIPTION OF THE DRAWINGS

FIG. 3 is a sectional view of the marine vibrator of FIG. 2a; and

DETAILED DESCRIPTION

Figure 1:
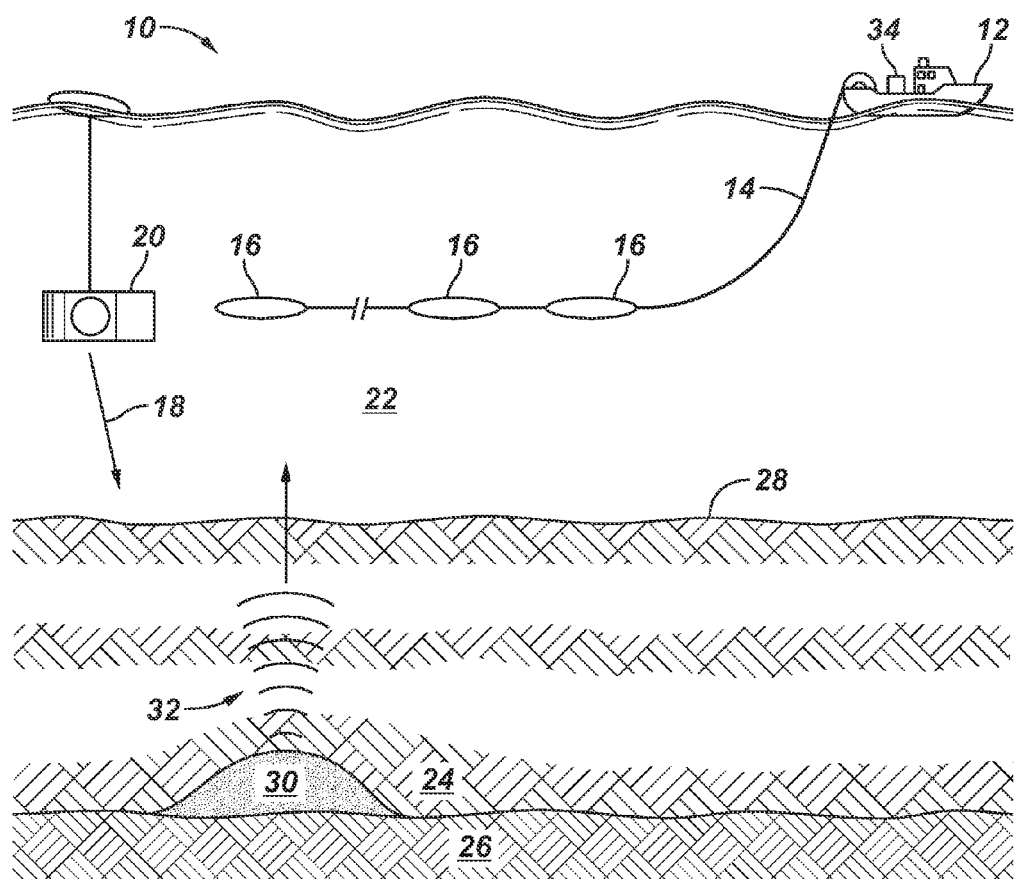
FIG. 1 is a schematic depiction of a marine seismic spread according to one embodiment of the present disclosure.

FIG. 1 depicts an embodiment 10 of a marine seismic data acquisition system in accordance with some embodiments of the disclosure. In the system 10, a survey vessel 12 tows one or more seismic streamers 14 (one exemplary streamer 14 being depicted in FIG. 1). The seismic streamers 14 may be several thousand meters long and may contain various support cables (not shown), as well as wiring and/or circuitry (not shown) that may be used to support communication along the streamers 14. In general, each streamer 14 includes a primary cable into which is mounted seismic sensors 16 that record seismic signals. It is to be appreciated that the sensors 16 are illustrated schematically for emphasis in FIG. 1, and that in practice, the sensors 16 are disposed within the streamer cable 14. The seismic sensors 16 may include pressure sensors (e.g., hydrophones) and/or particle motion sensors (e.g., accelerometers).

The marine seismic data acquisition system 10 includes a seismic source 20 that takes the form of a marine vibrator. In some embodiments of the disclosure, the seismic source 20 may be towed by the survey vessel 12. In other embodiments, the seismic source 20 may operate independently of the survey vessel 12, in that the seismic source may be coupled to other vessels or buoys, as just a few examples.

As the seismic streamers 14 are towed behind the survey vessel 12, acoustic signals 18 (an exemplary acoustic signal 18 being depicted in FIG. 1), are produced by the seismic source 20 and are directed down through a water column 22 into strata 24 and 26 beneath a water bottom surface 28. The acoustic signals 18 are reflected from the various subterranean geological formations, such as an exemplary formation 30 that is depicted in FIG. 1. The incident acoustic signals 18 produce corresponding reflected acoustic signals, or pressure waves 32, which are sensed by the seismic sensors 16.

The goal of the seismic acquisition is to build up an image of a survey area for purposes of identifying subterranean geological formations, such as the exemplary geological formation 30. Subsequent analysis of the representation may reveal probable locations of hydrocarbon deposits in subterranean geological formations. Depending on the particular embodiment of the disclosure, portions of the analysis of the representation may be performed on the seismic survey vessel 12, such as by a signal processing unit 34.

Figure 2A:
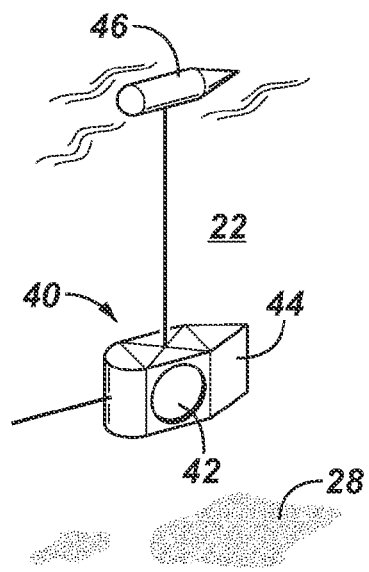
FIG. 2a is a schematic depiction of a marine vibrator with a single transducer in deployment.
Figure 2B:
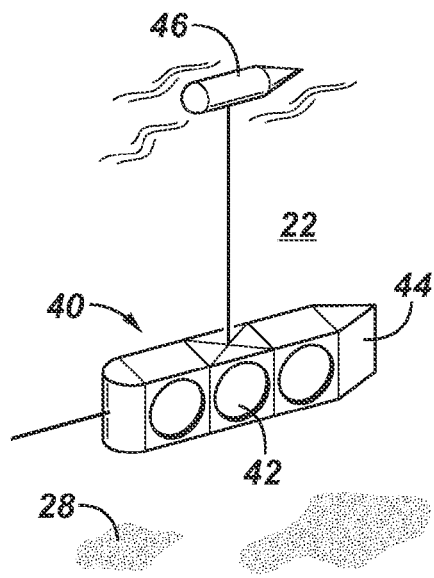
FIG. 2b is a schematic depiction of another marine vibrator with multiple transducers in deployment.

Having generally described the seismic data acquisition process, attention is now directed to the seismic source 20, which in the present disclosure, takes the form of a marine vibrator 40. Referring to FIG. 2a, the marine vibrator 40 includes a transducer element, which is formed of a movable piston 42 within a housing 44. In some embodiments, such as that depicted in FIG. 2b, the marine vibrator 40 may be formed of a plurality of transducer elements. The marine vibrator 40 may be suspended in the water column 22 from a flotation element 46, such as a float or buoy. In some embodiments, the marine vibrator 40 may be towed by a vessel, such as a streamer vessel or a source-dedicated vessel. In still further embodiments, the marine vibrator 40 may be positioned on the seafloor 28 in an autonomous manner or tethered to a flotation device. The marine vibrator 40 generally operates by actuation of the piston 42 within the housing 44, which causes displacement of water to generate acoustic signals that are driven into the earth's surface.

Figure 3:
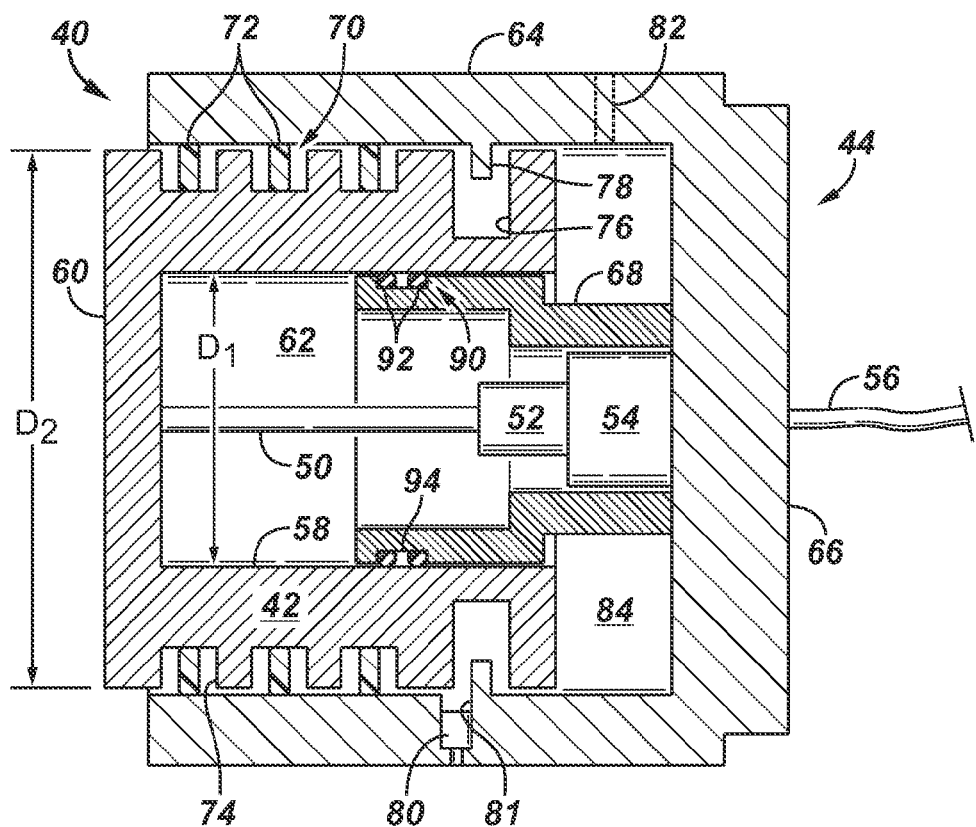

Referring to FIG. 3, in one embodiment, the piston 42 extends from a shaft 50 operatively connected to the housing 44 via an actuator 52. In some embodiments, a power device 54 is provided within the housing 44 to provide the necessary energy for driving the actuator. The power device may be a hydraulic, electrical or pneumatic power pack or a combination of any of those. The power device 54 may receive power from a survey vessel through a cable 56. The power may be in electrical, hydraulic or pneumatic form. The cable 56 may also carry signals for instructing operation of the piston 42. In other embodiments, the power device 54 may be located away from the marine vibrator 40, such as on the float 46 (FIG. 2a) or on the survey vessel 12 (FIG. 1).

The piston 42 includes an annular portion 58 and a face portion 60 connecting the annular portion at the interface with seawater. The annular portion 58 defines a cavity 62 that may be filled with liquid (e.g., hydraulic fluid) or gas (e.g., air). The cavity 62 permits extension of the shaft 50 therethrough to connect with and activate the piston 42.

Similar to the piston 42, the housing 40 includes both an annular portion 64 and a face portion 66 connecting the annular portion. The housing 40 may be formed as a unitary or modular structure and remains substantially stationary during actuation of the piston 42. The housing 40 further includes an inner portion 68, which extends from the face portion 66 of the housing. The inner portion 68 is spaced from the housing's annular portion 64 to define an annular space, part of which is occupied by the piston 42 and the remaining portion of which is filled with a gas (e.g., air) or a liquid (e.g., hydraulic fluid). The inner portion 68 provides additional support for the piston 42.

The piston 42 is sealed at two separate locations with the housing. A first seal 70 is defined between annular portions of the piston 42 and housing 40. In some embodiments, the seal 70 takes the form of guide rings 72, which are disposed in circumferential slots 74 defined in the outer surface of the piston's annular portion 58. Although three guide rings 72 are depicted in FIG. 3, it is to be appreciated that more or less guide rings may be used to effect the seal 70. The size and shape of the guide rings 72 and corresponding slots 74 may also be variable. In some embodiments, the guide rings may be formed of polytetrafluoroethylene (PTFE). Of course, the seal 70 may take a form of a sealing element other than guide rings. For example, the seal 70 may comprise O-rings or other suitable sealing devices, which act to prevent the ingress of seawater into the marine vibrator 40.

In some instances, seawater may penetrate the first seal 70. The piston 42 and housing 44 may thus be sized and shaped to collect any such seawater that penetrates the first seal 70. In one embodiment, a collection reservoir 76 may be defined in the annular portion 58 of the piston 42 and downstream (following the path of the seawater entering the vibrator 40) of the seal 70. A projection 78 may preferably extend inwardly from the housing's annular portion 64 to direct seawater into the collection reservoir 76. A pump 80 positioned adjacent to the reservoir 76 and in the annular portion 64 of the housing 40 may be used to expel the undesirable seawater from the marine vibrator 40. In one embodiment, a groove 81 is defined in the housing's annular portion 64 and adjacent to the pump 80. The groove 81 may assist with the collection of seawater, thus enabling expulsion via the pump. In some embodiments, a hose 82 may pass through the housing 44 to provide gas (e.g., air) or liquid (e.g., hydraulic fluid) to a cavity 84 defined downstream of the reservoir 76 by the piston 42, the housing 44 and the inner portion 68 of the housing.

A second seal 90 is defined between the piston 42 and housing 44, and more particularly, between the outer surface of the inner portion 68 of the housing and the inner surface of the annular portion 58 of the piston. In this manner, the seal 90 is positioned radially inward of the first seal 70 and also away from the seawater interface. In one embodiment, the seal 90 may take the form of O-rings 92, which are disposed in a slot 94 defined in the inner portion 68 of the housing 44. Of course, other types of seals are contemplated as falling within the scope of the present disclosure, such as stuffing boxes, quad rings or any kind of piston seals.

The annular portion 58 of the piston 42 may be variable in size such that the ratio of the diameter $D_1$ of the cavity 62 and the diameter $D_2$ of the face portion 60 is variable. For example, in some embodiments, the cavity 62 may be large, thus resulting in a diameter ratio of 0.5. In other embodiments, the cavity 62 may be reduced in size, thus resulting in a smaller ratio, such as 0.2. In embodiments where the diameter ratio is relatively smaller, the O-rings 92 may be reduced in size. Reduction in size of the O-rings 92 reduces manufacturing costs and increases the overall reliability of the vibrator 40.

Conventional marine vibrators employ sealing elements adjacent to the seawater interface. Such sealing elements have proved to be unreliable, thus leading to damage of the marine vibrator. By constructing the marine vibrator 40 with the two-stage seal described herein, the reliability of the marine vibrator is improved. The first seal 70 can be considered a dirty seal in that it interfaces with the seawater and perhaps allows some seawater ingress. However, the second seal 90 can be considered a clean seal in that it does not interface with seawater and does not undergo the wear and tear of traditional seals associated with marine vibrators. In this manner, the reliability of the marine vibrator 40 is improved over those of the prior art.

Figure 4:
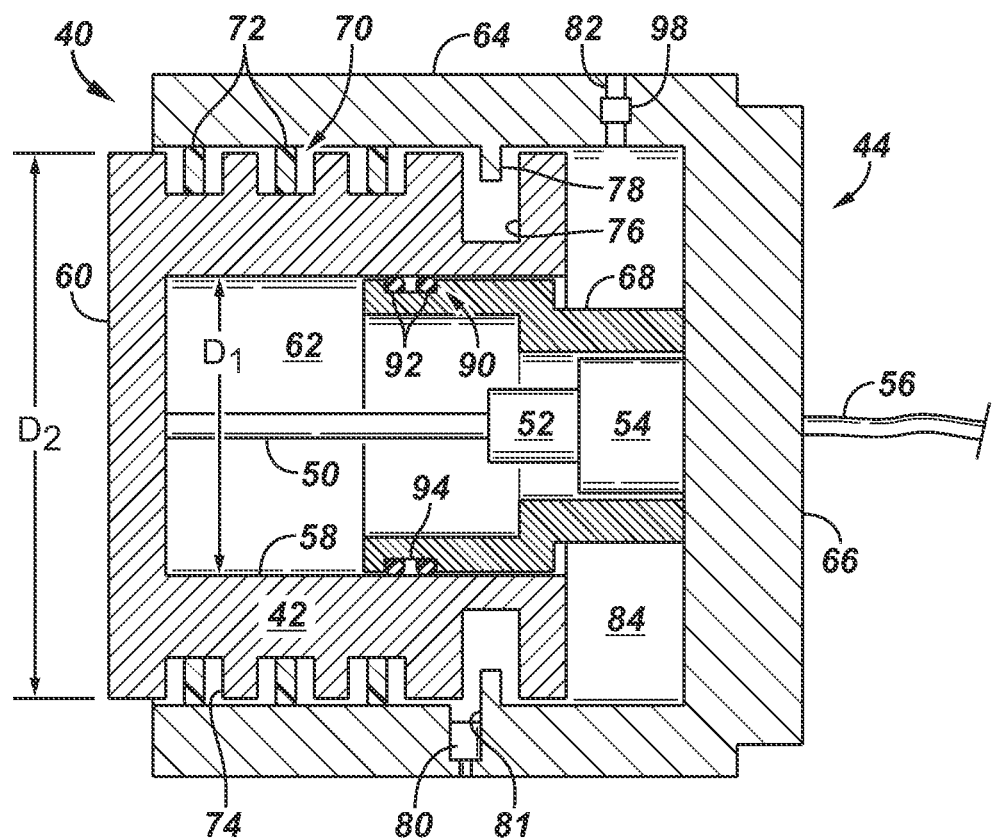
FIG. 4 is a sectional view of another embodiment of a marine vibrator.

Referring to FIG. 4, in another embodiment, the marine vibrator 40 may include a pump 98 disposed in the hose 82 that carries gas or liquid to the marine vibrator. As the marine vibrator 40 is positioned at varying depths, the pump 98 may be actuated to compensate for pressure changes in the vibrator. The pump 98 may also be used to selectively adjust the amount of gas or liquid input into the cavity 84. For example, in scenarios where water leaks across the first seal 70, air may be input into the cavity 84 through the hose 82 and pump 98 to dispel such water. Of course, the pump 98 may be disposed in various locations relative to the hose 82, such as at the distal end of the hose.

While the present disclosure has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present disclosure.

What is claimed is:

1. A marine vibrator, comprising:
a housing having a first portion and a second portion, the second portion of the housing disposed coaxially with the first portion and radially inward of the first portion;
a piston movably disposed within the housing, the piston disposed within the first portion of the housing, and the second portion of the housing disposed within the piston;
a first seal disposed between the piston and the first portion of the housing;
a second seal disposed between the piston and the second portion of the housing, the second seal being located radially inward of the first seal;
a first internal cavity within the housing defined by the first seal, the second seal, the piston, the first portion of the housing and the second portion of the housing; and
a second internal cavity within the housing defined by the second seal, the second portion of the housing and the piston, the second internal cavity separated from an external environment by the first cavity.

2. A marine vibrator according to claim 1, wherein the first portion of the housing is an annular portion of the housing and the second portion of the housing is an inner portion of the housing extending within the annular portion of the housing.

3. A marine vibrator according to claim 2, wherein the piston is partially disposed between the first portion of the housing and the second portion of the housing.

4. A marine vibrator according to claim 1, wherein the piston includes one or more slots formed circumferentially about the piston.

5. A marine vibrator according to claim 4, wherein the first seal comprises one or more sealing elements disposed in the one or more slots.

6. A marine vibrator according to claim 5, wherein the one or more sealing elements are PTFE guide rings.

7. A marine vibrator according to claim 1, wherein the second portion of the housing includes a slot formed in an outer surface thereof.

8. A marine vibrator according to claim 7, wherein the second seal comprises one or more O-rings disposed in the slot formed in the second portion of the housing.

9. A marine vibrator according to claim 1, wherein a reservoir is defined in the piston, the reservoir being downstream of the first seal.

10. A marine vibrator, comprising:
a housing having a first portion and a second portion;
a piston movably disposed within the housing;
a first seal disposed between the piston and the first portion of the housing; and
a second seal disposed between the piston and the second portion of the housing, the second seal being located radially inward of the first seal, wherein
a reservoir is defined in the piston,
the reservoir is downstream of the first seal, and
a projection extends inwardly from the first portion of the housing, the projection extending at least partially into the reservoir.

11. A marine vibrator according to claim 10, further comprising a pump disposed in the first portion of the housing, the pump being operable to dispel water that collects in the reservoir.

12. A marine vibrator according to claim 11, further comprising a groove defined in the first portion of the housing and adjacent to the pump.

13. A marine vibrator according to claim 1, wherein a conduit is formed through the first portion of the housing, the conduit being operable to supply air or liquid into the marine vibrator.

14. A marine vibrator according to claim 1, further comprising a power device disposed in an interior space of the marine vibrator, the power device being operable to power an actuator operatively connected to the piston.

15. A marine vibrator according to claim 14, wherein power for the power device is supplied from a surface vessel through a cable in the form of pneumatics, hydraulics or electrical power.

16. A marine vibrator according to claim 1, wherein the piston includes an annular portion extending from a face portion, the annular portion defining a cavity with a diameter $D_1$ and the face portion having a diameter $D_2$, further wherein the ratio of $D_1/D_2$ is 0.7 or less.

17. A marine vibrator according to claim 13, further comprising a pump disposed in the conduit to selectively adjust the amount of air or gas supplied to the marine vibrator.

18. A seismic spread, comprising:
a survey vessel;
one or more streamers extending from the survey vessel, the streamers being operable to gather seismic data in a survey area; and
one or more marine vibrators disposed in the survey area, the one or more marine vibrators comprising:
a housing having a first portion and a second portion, the second portion of the housing disposed coaxially with the first portion and radially inward of the first portion;
a piston movably disposed within the housing, the piston disposed within the first portion of the housing, and the second portion of the housing disposed within the piston;
a first seal disposed between the piston and the first portion of the housing;
a second seal disposed between the piston and the second portion of the housing, the second seal being located radially inward of the first seal;
a first internal cavity within the housing defined by the first seal, the second seal, the piston, the first portion of the housing and the second portion of the housing; and
a second internal cavity within the housing defined by the second seal, the second portion of the housing and the piston, the second internal cavity separated from an external environment by the first cavity.

19. A seismic spread according to claim 18, wherein the one or more marine vibrators are suspended in the water column from a surface float.

20. A seismic spread according to claim 18, wherein the one or more marine vibrators are positioned on the seafloor.

21. A marine vibrator according to claim 18, wherein the one or more marine vibrators are towed by a vessel.

22. A method for improving the reliability of a marine vibrator, comprising:
providing a marine vibrator having a piston movably disposed within a housing, the piston disposed within a first portion of the housing, and a second portion of the housing disposed within the piston;

forming a first seal between the piston and the first portion of the housing; and forming a second seal between the piston and the second portion of the housing, the second seal being formed radially inward relative to the first seal, wherein the forming the second seal includes defining a first internal cavity within the housing by the first seal, the second seal, the piston, the first portion of the housing and the second portion of the housing, and the forming the second seal includes defining a second internal cavity within the housing by the second seal, the second portion of the housing and the piston, the second internal cavity separated from an external environment by the first cavity.

23. A method according to claim 22, further comprising collecting water downstream of the first seal and dispelling the water from the marine vibrator.

24. A method according to claim 23, wherein the step of dispelling comprises actuating a pump to dispel the water.

25. A method according to claim 23, further comprising providing a pump to selectively adjust air or liquid supplied to the marine vibrator.

* * * * *